No. 882,965. PATENTED MAR. 24, 1908.
F. L. RAND.
PAINTER'S HOOK.
APPLICATION FILED JAN. 24, 1906.
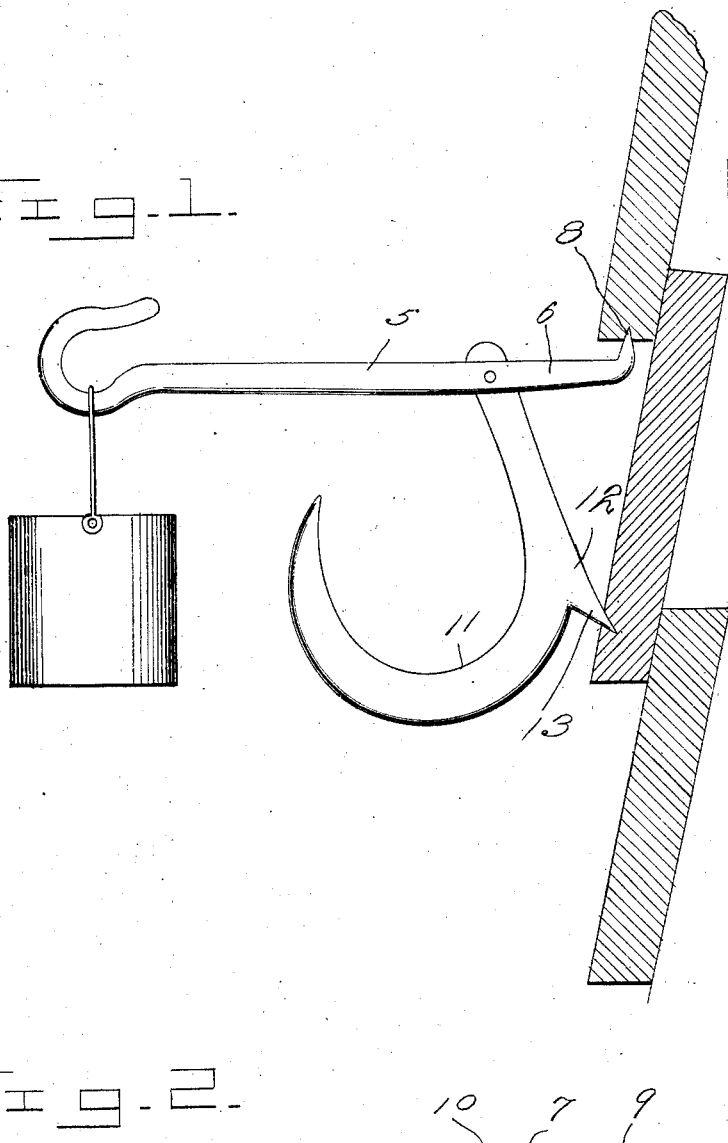
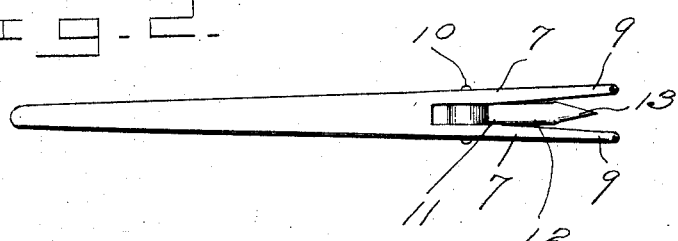

UNITED STATES PATENT OFFICE.

FRANK L. RAND, OF PITTSFIELD, NEW HAMPSHIRE.

PAINTER'S HOOK.

No. 882,965.     Specification of Letters Patent.     Patented March 24, 1908.

Application filed January 24, 1906. Serial No. 297,700.

*To all whom it may concern:*

Be it known that I, FRANK L. RAND, a citizen of the United States, residing at Pittsfield, in the county of Merrimack, State of New Hampshire, have invented certain new and useful Improvements in Painters' Hooks; and I do declare the following to be a full, clear, and exact description of the invention, such as will enable others skilled in the art to which it appertains to make and use the same.

This invention relates to painters' hooks and has for its object to provide a device of this character which shall be simple in construction and which may be securely engaged with the clap-boards of a house, with the rungs of a ladder, etc.

The disadvantage found in the present devices of this character is that they do not securely hold to the house after being placed in position.

The primary object of this invention is to obviate this disagreeable feature without complicating the present construction of hook.

In the accompanying drawings: Figure 1 is a side elevation of my invention showing the same applied to the side of a house or the like. Fig. 2 is a top plan view, Referring to the drawings, the numeral 5 denotes a tapering hook ended bar and 6 the slotted arm provided shank of the same as shown in Fig. 2. The shank 6 of the hook has its end slotted or bifurcated to form spaced arms 7 which have their extreme ends bent upwardly as at 8 and pointed. The opposing faces of the arms 7 are parallel for a portion of their distance to form bearings and then diverge outwardly as at 9. The bar is tapered from its bifurcated end to the hook end as shown in Fig. 2 of the drawings.

Pivoted in any suitable manner upon a pin 10 between the arms 7 and between the parallel faces thereof is the straight shank of a bar 12 formed with an outwardly and upwardly curving hook 11. The inner edge of the shank of the hook is curved in a continuous line with the inner edge of the hook proper, but the outer edge of the said bar is curved gradually outwardly at its junction with the hook proper to form one side of a spear end forming a spur 13, the other side of said spur being extended from the point thereof to the outer edge of the hook and lying at an acute angle to the adjacent portion of the said outer edge of the hook.

In operation, the spur 13 is firmly engaged in one of the clap-boards of a house and the hook 5 is moved to bring the points or spurs 8 into engagement between the said clapboard and the lower edge of the said clapboard next above. It will be noted that by reason of the peculiar construction of the spur 13, weight upon the device will cause the said spur to be more firmly embedded in the side of the house.

I am well aware that it is not new broadly to construct a painter's hook adapted to be removably secured to the side of a wooden building as that has been accomplished before, notably in the pioneer patent to J. W. Pattee, No. 79,853, issued July 14, 1868 so I confine myself to a painter's hook as specifically shown and described.

What is claimed is:

A painter's hook comprising a tapering bar having a hook at one end and a slot at the other to form spaced arms which are bent outwardly and have their extreme ends bent upwardly and pointed, the opposing faces of said arms near the beginning of said slot running parallel to form a bearing, each arm having a pin perforation extending through its face, a pin within said perforations, and a second hook ended bar of a length less than said first mentioned bar provided with an extending spur at the point where the hook is formed outwardly from said bar, said last mentioned hook and spur extending in opposite directions.

In testimony whereof, I affix my signature, in presence of two witnesses.

FRANK L. RAND.

Witnesses:
H. B. FISCHER,
E. A. GOSS.